US012729652B2

(12) United States Patent
Kupratis et al.

(10) Patent No.: US 12,729,652 B2
(45) Date of Patent: Sep. 8, 2026

(54) BLEEDING CORE AIR FROM A TURBINE ENGINE CORE FLOWPATH

(71) Applicant: RTX Corporation, Farmington, CT (US)

(72) Inventors: Daniel B. Kupratis, Wallingford, CT (US); Christopher J. Hanlon, Sturbridge, MA (US); Steven J. Laporte, Coventry, CT (US); Michael G. McCaffrey, Windsor, CT (US)

(73) Assignee: RTX Corporation, Farmington, CT (US)

( * ) Notice: Subject to any disclaimer, the term of this patent is extended or adjusted under 35 U.S.C. 154(b) by 74 days.

(21) Appl. No.: 18/747,063

(22) Filed: Jun. 18, 2024

(65) Prior Publication Data

US 2025/0382922 A1 Dec. 18, 2025

(51) Int. Cl.
*F02C 7/18* (2006.01)
*F02C 7/36* (2006.01)
*F02C 9/18* (2006.01)

(52) U.S. Cl.
CPC .................. *F02C 9/18* (2013.01); *F02C 7/18* (2013.01); *F02C 7/36* (2013.01); *F05D 2260/232* (2013.01); *F05D 2260/40311* (2013.01)

(58) Field of Classification Search
CPC .... F02C 7/05; F02C 7/052; F02C 6/08; F02C 9/18; F02C 7/12–18; F01D 25/12; F05D 2260/40; F05D 2260/23
See application file for complete search history.

(56) References Cited

U.S. PATENT DOCUMENTS 9,909,497 B2 3/2018 Feulner
9,920,708 B2 * 3/2018 Suciu .................... F01D 25/125
10,144,519 B2 12/2018 Schwarz
10,590,851 B1 * 3/2020 Moore .................. G01M 15/14
11,408,343 B1 * 8/2022 Hanrahan ................. F02C 9/18
12,180,898 B1 * 12/2024 Kupratis .................. F02C 6/08
(Continued)

FOREIGN PATENT DOCUMENTS

EP 3736424 A1 * 11/2020 ................ F02C 9/18
FR 3094045 B1 12/2022

OTHER PUBLICATIONS

EP search report for EP25183811.6 dated Nov. 20, 2025.

*Primary Examiner* — Nathaniel E Wiehe
*Assistant Examiner* — Maxime M Adjagbe
(74) *Attorney, Agent, or Firm* — Getz Balich LLC

(57) ABSTRACT

An engine core includes a compressor section and a core flowpath. The compressor section includes first and second compressor rotors. The core flowpath extends across the first compressor rotor and the second compressor rotor between an inlet into the core flowpath and an exhaust from the core flowpath. An air system includes an eductor, a first bleed port, a second bleed port, a first passage and a second passage. The eductor includes a nozzle disposed in the second passage. The first bleed port is disposed along the core flowpath at a downstream end of the first compressor rotor. The first bleed port fluidly couples the core flowpath to the first passage and the second passage in parallel. The second bleed port is disposed along the core flowpath at a downstream end of the second compressor rotor. The second bleed port fluidly couples the core flowpath to the nozzle.

20 Claims, 4 Drawing Sheets

(56) References Cited

U.S. PATENT DOCUMENTS

| | | | | |
|---|---|---|---|---|
| 2011/0146297 | A1* | 6/2011 | Balandier | F04D 27/0215<br>60/785 |
| 2013/0209229 | A1* | 8/2013 | Xu | F01D 5/186<br>415/115 |
| 2015/0176530 | A1* | 6/2015 | Schwarz | F02C 3/107<br>60/726 |
| 2016/0123235 | A1 | 5/2016 | Siering | |
| 2016/0265442 | A1 | 9/2016 | Beecroft | |
| 2023/0066572 | A1* | 3/2023 | Hall | F01D 25/04 |

* cited by examiner 90
92
96
98
140
68
100
88
94
86
84
66
20,26
42,44
34

112
106B
124B
122B
108B
118B
120B
80
130
116
104B
114
66
92
42,44
20,26
34

BLEEDING CORE AIR FROM A TURBINE ENGINE CORE FLOWPATH

BACKGROUND OF THE DISCLOSURE

1. Technical Field

This disclosure relates generally to an aircraft and, more particularly, to bleeding air from a flowpath of an aircraft engine.

2. Background Information

Various systems and methods are known in the art for bleeding air from a flowpath of an aircraft engine. While these known systems and methods have various benefits, there is still room in the art for improvement.

SUMMARY OF THE DISCLOSURE

According to an aspect of the present disclosure, an assembly is provided for a turbine engine. This assembly includes an engine core and an air system. The engine core includes a compressor section and a core flowpath. The compressor section includes a first compressor rotor and a second compressor rotor. The core flowpath extends across the first compressor rotor and the second compressor rotor between an inlet into the core flowpath and an exhaust from the core flowpath. The air system includes an eductor, a first bleed port, a second bleed port, a first passage and a second passage. The eductor includes a nozzle disposed in the second passage. The first bleed port is disposed along the core flowpath at a downstream end of the first compressor rotor. The first bleed port fluidly couples the core flowpath to the first passage and the second passage in parallel. The second bleed port is disposed along the core flowpath at a downstream end of the second compressor rotor. The second bleed port fluidly couples the core flowpath to the nozzle.

According to another aspect of the present disclosure, another assembly is provided for a turbine engine. This assembly includes an engine core and an air system. The engine core includes a first compressor rotor, a second compressor rotor, an air cooled component and a core flowpath. The air cooled component is along the core flowpath downstream of the second compressor rotor. The core flowpath extends across the first compressor rotor and the second compressor rotor between an inlet into the core flowpath and an exhaust from the core flowpath. The air system includes an eductor, a first bleed port, a second bleed port, a discharge passage and a cooling air passage. The eductor includes a nozzle disposed in the discharge passage. The first bleed port is disposed along the core flowpath at a downstream end of the first compressor rotor. The first bleed port fluidly couples the core flowpath to the discharge passage and the cooling air passage in parallel. The second bleed port is disposed along the core flowpath at a downstream end of the second compressor rotor. The second bleed port fluidly couples the core flowpath to the nozzle. The cooling air passage is configured to deliver cooling air to the air cooled component.

According to still another aspect of the present disclosure, another assembly is provided for a turbine engine. This assembly includes an engine core, a bypass flowpath and an air system. The engine core includes a compressor rotor, an air cooled component and a core flowpath. The air cooled component is along the core flowpath downstream of the compressor rotor. The core flowpath extends across the compressor rotor between an inlet into the core flowpath and an exhaust from the core flowpath. The bypass flowpath is outside of the engine core. The air system includes an air pump, a bleed port, an upstream discharge passage, a downstream discharge passage and a cooling air passage. The air pump is disposed with the downstream discharge passage. The bleed port is disposed along the core flowpath at the compressor rotor. The bleed port fluidly couples the core flowpath to the upstream discharge passage. The downstream discharge passage and the cooling air passage are in parallel. An outlet from the upstream discharge passage and an outlet from the downstream discharge passage are fluidly coupled to the bypass flowpath with the outlet from the downstream discharge passage disposed downstream of the outlet from the upstream discharge passage along the bypass flowpath. The cooling air passage is configured to deliver cooling air to the air cooled component.

The air pump may be configured as or otherwise include an eductor.

The eductor may be configured as or otherwise include a nozzle. The bleed port may be a first bleed port. The air system may also include a second bleed port. The second bleed port may be disposed along the core flowpath downstream of the first bleed port. The second bleed port may fluidly couple the core flowpath to the nozzle.

The assembly may also include a propulsor rotor. The engine core may also include a turbine rotor and a geartrain. The turbine rotor may be configured to drive rotation of the propulsor rotor and the first compressor rotor through the geartrain. The turbine rotor may be configured to drive rotation of the second compressor rotor independent of the geartrain.

The discharge passage may be a first discharge passage, and the air system may also include a second discharge passage. The first bleed port may fluidly couple the core flowpath to the first discharge passage, the second discharge passage and the cooling air passage in parallel.

The engine core may also include a first turbine rotor and a geartrain. The core flowpath may extend across the first turbine rotor between the second compressor rotor and the exhaust from the core flowpath. The first turbine rotor may be coupled to the first compressor rotor through the geartrain. The first turbine rotor may be coupled to the second compressor rotor independent of the geartrain.

The assembly may also include a propulsor rotor outside of the engine core. The first turbine rotor may be coupled to the propulsor rotor through the geartrain. The first compressor rotor may be coupled to the geartrain through the propulsor rotor.

The geartrain may be configured as or otherwise include a star gear system.

The geartrain may be configured as or otherwise include a planetary gear system.

The engine core may also include a third compressor rotor and a second turbine rotor. The core flowpath may extend across the third compressor rotor and the second turbine rotor between the second compressor rotor and the first turbine rotor. The second turbine rotor may be coupled to the third compressor rotor. The second turbine rotor may be configured to rotate independent of the first turbine rotor.

The air system may also include a valve configured to regulate gas flow from the second bleed port to the nozzle.

The second passage may include a convergent section, a divergent section and a throat between the convergent section and the divergent section. The divergent section may be downstream of the convergent section. The nozzle may project through the throat and into the divergent section to a tip of the nozzle.

The assembly may also include a bypass flowpath disposed outside of the engine core. An outlet from the first passage and an outlet from the second passage may be fluidly coupled to the bypass flowpath.

The outlet from the second passage may be downstream of the outlet from the first passage along the bypass flowpath.

The engine core may also include an air cooled component along the core flowpath downstream of the second compressor rotor. An outlet from the second passage may be fluidly coupled to the air cooled component.

The engine core may also include a variable guide vane array along the core flowpath at an upstream end of the second compressor rotor.

The air system may also include a third passage radially inboard of the second passage. The first bleed port may fluidly couple the core flowpath to the second passage and the third passage in parallel.

The engine core may also include an air cooled component along the core flowpath downstream of the second compressor rotor. The air system may be configured to direct air to the air cooled component from an outlet from the third passage.

The air system may also include a valve configured to regulate gas flow through the third passage.

The air system may also include a first valve, a second valve and a control module in signal communication with the first valve and the second valve. The first valve may be configured inline between the second bleed port and the nozzle. The second valve may be configured inline along the third passage.

The engine core may also include a variable guide vane array along the core flowpath at an upstream end of the second compressor rotor. The control module may be in signal communication with an actuator for the variable guide vane array.

The present disclosure may include any one or more of the individual features disclosed above and/or below alone or in any combination thereof.

The foregoing features and the operation of the invention will become more apparent in light of the following description and the accompanying drawings.

DETAILED DESCRIPTION

Figure 1:
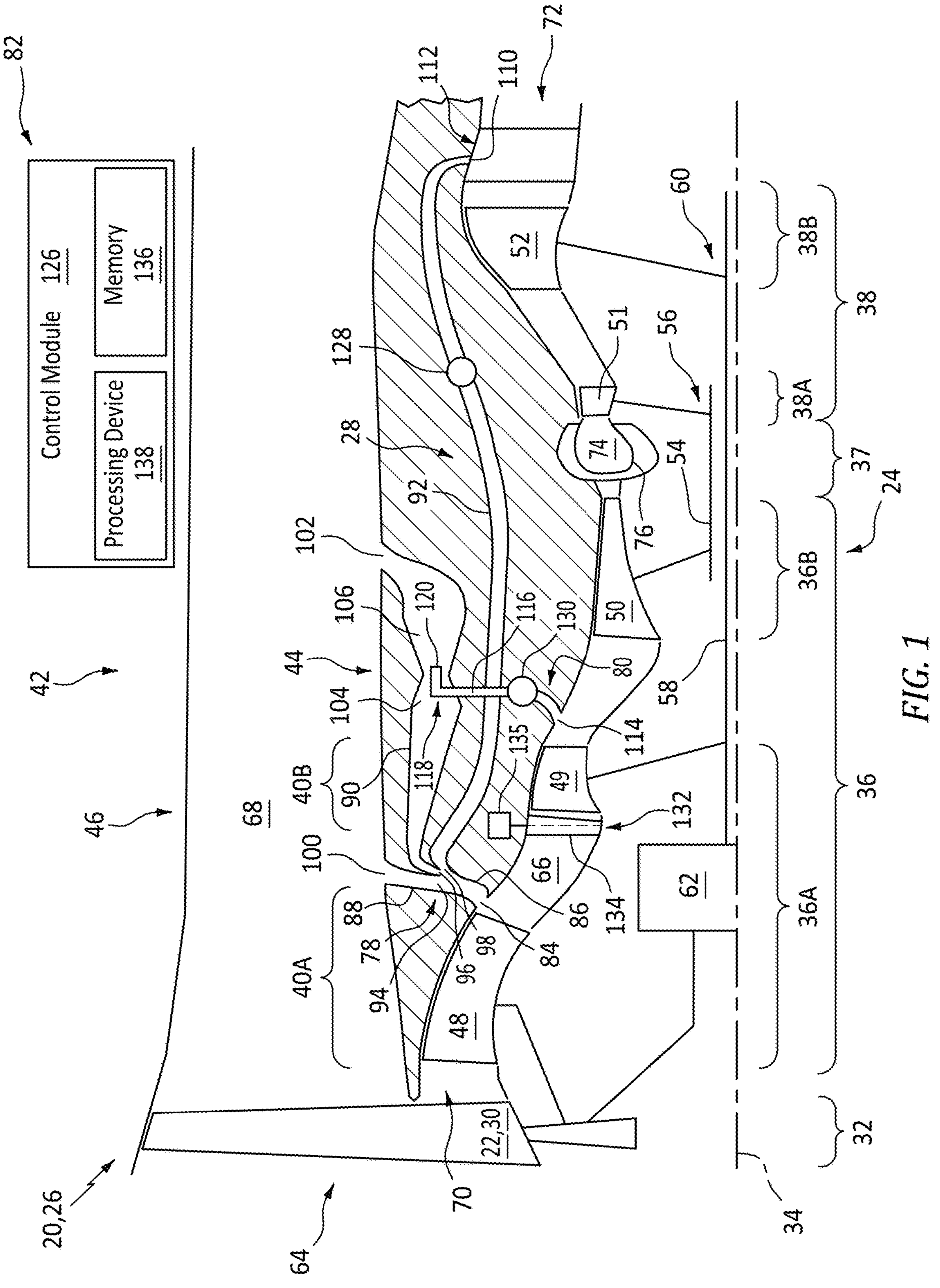
FIG. 1 is a partial schematic illustration of an aircraft propulsion system.

FIG. 1 illustrates a propulsion system 20 for an aircraft. The aircraft may be an airplane, a helicopter, a drone (e.g., an unmanned aerial vehicle (UAV)) or any other manned or unmanned aerial vehicle or system. The aircraft propulsion system 20 of FIG. 1 includes a bladed propulsor rotor 22 and a core 24 of a gas turbine engine 26 configured to mechanically drive rotation of the propulsor rotor 22. The aircraft propulsion system 20 and its turbine engine 26 also include an air system 28.

The propulsor rotor 22 is an air mover disposed outside of the engine core 24. The propulsor rotor 22 may be a ducted propulsor rotor or an open propulsor rotor; e.g., an un-ducted propulsor rotor. An example of the ducted propulsor rotor is a fan rotor 30 where the turbine engine 26 is a turbofan engine. Examples of the open propulsor rotor include: a propfan rotor where the turbine engine 26 is a propfan engine; a pusher fan rotor where the turbine engine 26 is a pusher fan engine; a propeller where the turbine engine 26 is a turboprop engine; and a rotorcraft rotor (e.g., a main helicopter rotor) where the turbine engine 26 is a turboshaft engine. The present disclosure, of course, is not limited to the foregoing exemplary propulsor rotor configurations nor to the foregoing exemplary turbine engine configurations. However, for ease of description, the propulsor rotor 22 is generally described below as the fan rotor 30 within a fan section 32 of the turbine engine 26.

The turbine engine 26 extends axially along an axis 34 from a forward, upstream end of the turbine engine 26 to an aft, downstream end of the turbine engine 26. This axis 34 may be a centerline axis of the turbine engine 26, the engine core 24 and/or one or more members of the turbine engine 26. The axis 34 may also or alternatively be a rotational axis of one or more rotating members of the turbine engine 26 and its engine core 24. The engine core 24 includes a compressor section 36, a combustor section 37 and a turbine section 38. The compressor section 36 of FIG. 1 includes a low pressure compressor (LPC) section 36A and a high pressure compressor (HPC) section 36B, and the LPC section 36A of FIG. 1 includes a low speed compressor (LSC) block 40A and a high speed compressor (HSC) block 40B. The turbine section 38 of FIG. 1 includes a high pressure turbine (HPT) section 38A and a low pressure turbine (LPT) section 38B.

The engine sections 32 and 36A-38B may be arranged sequentially axially along the axis 34. The LSC block 40A is axially between the fan section 32 and the HSC block 40B. The HSC block 40B is axially between the LSC block 40A and the combustor section 37. The engine sections 32 and 36A-38B of FIG. 1 are arranged within an engine housing 42. This engine housing 42 includes an inner housing structure 44 (e.g., a core case and nacelle inner fixed structure (IFS)) and an outer housing structure 46 (e.g., a fan case). The inner housing structure 44 of FIG. 1 houses the engine core 24 and its engine sections 36A-38B including the LSC block 40A and the HSC block 40B. The outer housing structure 46 of FIG. 1 houses the fan section 32.

The LPC section 36A includes a low speed low pressure compressor (LSLPC) rotor 48 and a high speed low pressure compressor (HSLPC) rotor 49. The LSLPC rotor 48 is disposed within the LSC block 40A. The HSLPC rotor 49 is disposed within the HSC block 40B. The HPC section 36B includes a high pressure compressor (HPC) rotor 50. The HPT section 38A includes a high pressure turbine (HPT) rotor 51. The LPT section 38B includes a low pressure turbine (LPT) rotor 52. Each of these engine rotors 48-52 and the fan rotor 30 includes a plurality of rotor blades arranged circumferentially around and connected to one or more respective rotor disks. The rotor blades, for example, may be formed integral with or mechanically fastened, welded, brazed and/or otherwise attached to the respective rotor disk(s). Each of the engine rotors 30, 48-52 may be rotatable about the axis 34.

The HPC rotor 50 is coupled to and rotatable with the HPT rotor 51. The HPC rotor 50 of FIG. 1, for example, is connected to the HPT rotor 51 by a high speed shaft 54. At least (or only) the HPC rotor 50, the HPT rotor 51 and the high speed shaft 54 collectively form a high speed rotating structure 56; e.g., a high speed spool of the engine core 24.

The HSLPC rotor 49 is coupled to and rotatable with the LPT rotor 52. The HSLPC rotor 49 of FIG. 1, for example, is connected to the LPT rotor 52 by a low speed shaft 58. At least (or only) the HSLPC rotor 49, the LPT rotor 52 and the low speed shaft 58 collectively form a low speed rotating structure 60; e.g., a low speed spool of the engine core 24. This low speed rotating structure 60 is further coupled to the fan rotor 30 (the propulsor rotor 22) and the LSLPC rotor 48 through a geartrain 62; e.g., a transmission, a speed change device, an epicyclic geartrain, etc. This geartrain 62 operatively couples the low speed rotating structure 60 and its LPT rotor 52 to the fan rotor 30 and the LSLPC rotor 48. Here, the LSLPC rotor 48 is coupled to the fan rotor 30 such that the LSLPC rotor 48 is coupled to the geartrain 62 through the fan rotor 30. With this arrangement of FIG. 1, the fan rotor 30 and the LSLPC rotor 48 rotate at a different (e.g., slower) rotational velocity than the low speed rotating structure 60 and its LPT rotor 52. Moreover, the fan rotor 30 and the LSLPC rotor 48 rotate at a common (the same) rotational velocity. The present disclosure, however, is not limited to such an exemplary arrangement. For example, it is contemplated the LSLPC rotor 48 may alternatively be coupled to the geartrain 62 independent of the fan rotor 30 in other embodiments.

During operation of the turbine engine 26 of FIG. 1, ambient air from outside of the aircraft propulsion system 20 enters the turbine engine 26 through an airflow inlet 64. This air is directed through the fan section 32 and into a core flowpath 66 (e.g., annular core flowpath) and a bypass flowpath 68 (e.g., annular bypass flowpath). The core flowpath 66 extends through the engine core 24 and sequentially through the engine sections 36A-38B from an airflow inlet 70 into the core flowpath 66 to a combustion products exhaust 72 from the core flowpath 66. The core flowpath 66 thereby extends sequentially across the LSLPC rotor 48, the HSLPC rotor 49, the HPC rotor 50, the HPT rotor 51 and the LPT rotor 52 between the core inlet 70 and the core exhaust 72. The air within the core flowpath 66 may be referred to as "core air". The bypass flowpath 68 extends through a bypass duct and bypasses (e.g., is radially outboard of and extends along) the engine core 24 and its inner housing structure 44. The air within the bypass flowpath 68 may be referred to as "bypass air". Note, where the propulsor rotor 22 is alternatively configured as the open propulsor rotor, the bypass flowpath 68 may be an open flowpath external to the aircraft propulsion system 20 and its engine housing 42.

The core air is compressed by the LSLPC rotor 48, the HSLPC rotor 49 and the HPC rotor 50 and directed into a combustion chamber 74 (e.g., an annular combustion chamber) of a combustor 76 (e.g., an annular combustor) in the combustor section 37. Fuel is injected into the combustion chamber 74 by one or more fuel injectors and mixed with the compressed core air to provide a fuel-air mixture. This fuel-air mixture is ignited and combustion products thereof flow through and sequentially drive rotation of the HPT rotor 51 and the LPT rotor 52 about the axis 34. The rotation of the HPT rotor 51 and the LPT rotor 52 respectively drive rotation of the HPC rotor 50 and the LPC rotors 48 and 49 and, thus, compression of the air received from the core inlet 70. Here, the LPT rotor 52 drives the rotation of the LSLPC rotor 48 through the geartrain 62, and the LPT rotor 52 drives the rotation of the HSLPC rotor 49 independent of the geartrain 62. The rotation of the LPT rotor 52 also drives rotation of the fan rotor 30 (the propulsor rotor 22) through the geartrain 62. The rotation of the fan rotor 30 propels the bypass air through the bypass flowpath 68 and out of the aircraft propulsion system 20 to provide thrust. The propulsion of the bypass air may account for a majority of the thrust generated by the aircraft propulsion system 20.

The air system 28 of FIG. 1 includes one or more air circuits 78 and 80 and a control system 82. The low pressure air circuit 78 includes an upstream bleed port 84, a manifold passage 86, an upstream discharge passage 88, a downstream discharge passage 90 and a cooling air passage 92.

The upstream bleed port 84 is configured to fluidly couple the core flowpath 66 to the manifold passage 86. The upstream bleed port 84, for example, may be formed as an opening in an outer flowpath wall along the core flowpath 66. Here, the outer flowpath wall forms a longitudinal section of an outer peripheral boundary of the core flowpath 66. The upstream bleed port 84 may be disposed at (e.g., on, adjacent or proximate) the LSLPC rotor 48, and upstream of the HSLPC rotor 49 along the core flowpath 66. The upstream bleed port 84 of FIG. 1, for example, is disposed at a downstream end of the LSLPC rotor 48.

The manifold passage 86 projects longitudinally (e.g., in a substantially radial direction) out from the upstream bleed port 84 to an inlet 94 into the upstream discharge passage 88, an inlet 96 into the downstream discharge passage 90 and an inlet 98 into the cooling air passage 92. The upstream discharge passage inlet 94 of FIG. 1 is disposed at a radial outer end of the manifold passage 86. The downstream discharge passage inlet 96 and the cooling air passage inlet 98 of FIG. 1 are disposed along a side of the manifold passage 86 at the radial outer end of the manifold passage 86. With this arrangement, the upstream bleed port 84 of FIG. 1 is fluidly coupled to the upstream discharge passage 88, the downstream discharge passage 90 and the cooling air passage 92 in parallel—through the manifold passage 86.

The upstream discharge passage 88 projects longitudinally from the upstream discharge passage inlet 94 to an outlet 100 from the upstream discharge passage 88. A trajectory of a centerline of the upstream discharge passage 88, at least at the upstream discharge passage inlet 94, may be substantially radial outward; e.g., with little or no axial component. The upstream discharge passage outlet 100 fluidly couples the upstream discharge passage 88 to the bypass flowpath 68. The upstream discharge passage outlet 100, for example, may be formed as an opening in an inner flowpath wall along the bypass flowpath 68. Here, the inner flowpath wall forms at least a longitudinal section of an inner peripheral boundary of the bypass flowpath 68.

Figure 2:
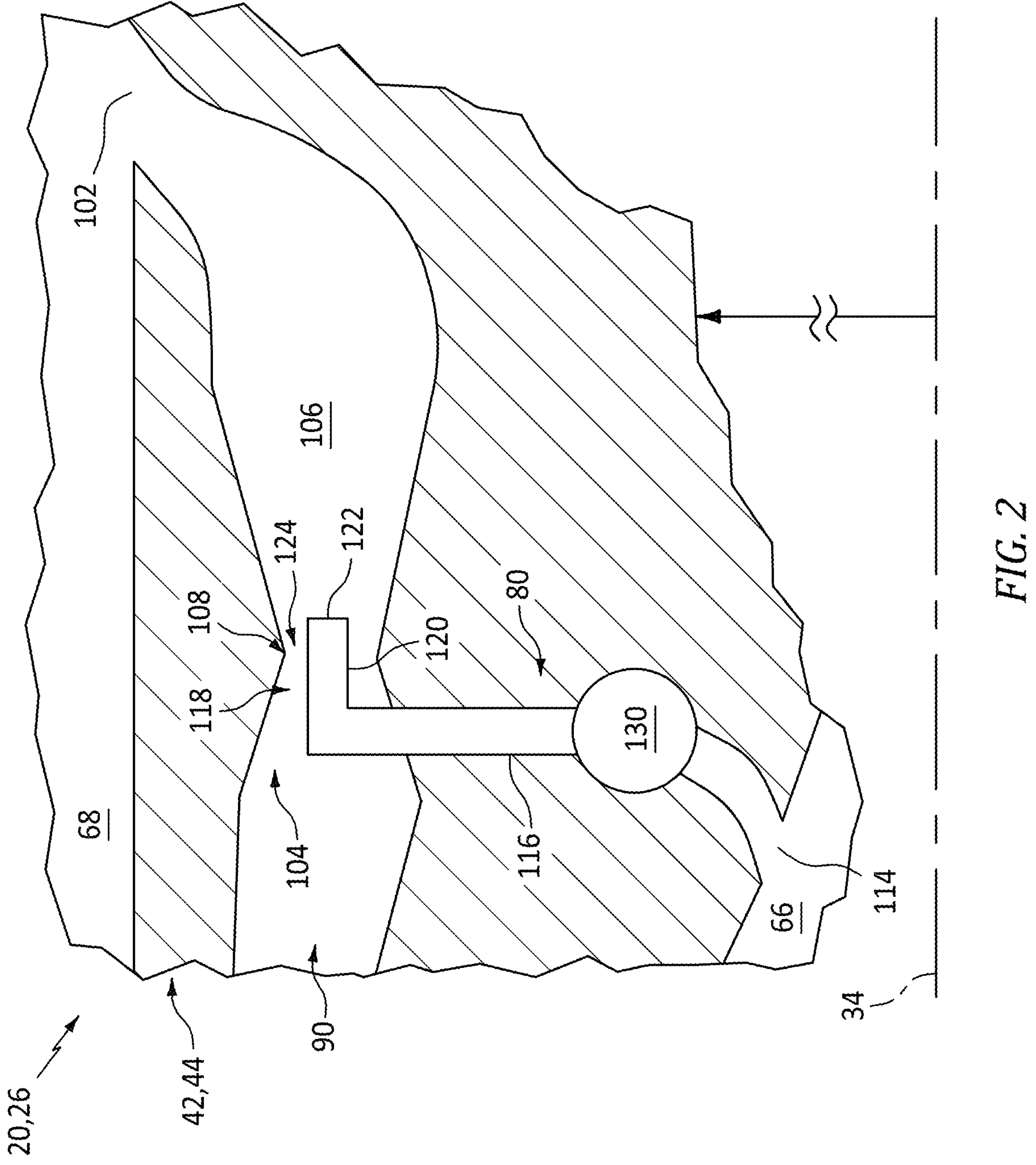
FIG. 2 is a schematic illustration of a portion of the aircraft propulsion system at an eductor.

The downstream discharge passage 90 projects longitudinally from the downstream discharge passage inlet 96 to an outlet 102 from the downstream discharge passage 90. A trajectory of a centerline of the downstream discharge passage 90, at the downstream discharge passage inlet 96, may be partially or substantially radial outward. The trajectory of the centerline of the downstream discharge passage 90, at the downstream discharge passage outlet 102, may be partially or substantially radial outward. The trajectory of the centerline of the downstream discharge passage 90, along an intermediate portion of the downstream discharge passage 90, may be partially or substantially axial. Referring to FIG. 2, along the intermediate portion of the downstream discharge passage 90, the downstream discharge passage 90 may include a convergent section 104 and a divergent section 106 with a throat 108 at an intersection between the convergent section 104 and the divergent section 106. Here, the divergent section 106 is downstream of the convergent section 104 along the downstream discharge passage 90. Referring again to FIG. 1, the downstream discharge passage outlet 102 fluidly couples the downstream discharge passage 90 to the bypass flowpath 68. The downstream discharge passage outlet 102, for example, may be formed as an opening in the inner flowpath wall. Here, the downstream discharge passage outlet 102 is disposed downstream of the upstream discharge passage outlet 100 longitudinally along the bypass flowpath 68.

The cooling air passage 92 projects longitudinally from the cooling air passage inlet 98 to an outlet 110 from the cooling air passage 92. A trajectory of a centerline of the cooling air passage 92, at the cooling air passage inlet 98, may be partially or substantially radial outward. The trajectory of the centerline of the cooling air passage 92, at the cooling air passage outlet 110, may be partially or substantially radial inward. The trajectory of the centerline of the cooling air passage 92, along an intermediate portion of the cooling air passage 92, may be partially or substantially axial. The cooling air passage outlet 110 may be fluidly coupled to or otherwise lead to at least one air cooled component 112 of the turbine engine 26 (or multiple air cooled components of the turbine engine 26). The cooling air passage 92 and, more generally, the air system 28 are thereby configured to direct and deliver (e.g., clean) cooling air to the air cooled component 112. Examples of the air cooled component 112 include, but are not limited to, a stator vane array (e.g., a turbine vane array, an exhaust vane array), a flowpath liner wall, or the like.

The high pressure air circuit 80 includes a downstream bleed port 114, a bleed passage 116 and an eductor 118; e.g., an ejector. The downstream bleed port 114 is configured to fluidly couple the core flowpath 66 to the bleed passage 116. The downstream bleed port 114, for example, may be formed as an opening in another outer flowpath wall along the core flowpath 66. Here, the outer flowpath wall forms another longitudinal section of the outer peripheral boundary of the core flowpath 66. The downstream bleed port 114 may be disposed at the HSLPC rotor 49, and downstream of the LSLPC rotor 48 and upstream of the HPC rotor 50 along the core flowpath 66. The downstream bleed port 114 of FIG. 1, for example, is disposed at a downstream end of the HSLPC rotor 49.

The bleed passage 116 projects longitudinally out from the downstream bleed port 114 to the eductor 118. The bleed passage 116 thereby fluidly couples the downstream bleed port 114 to the eductor 118. More particularly, referring to FIG. 2, the bleed passage 116 fluidly couples the downstream bleed port 114 to a nozzle 120 of the eductor 118.

The eductor nozzle 120 is disposed within the downstream discharge passage 90. More particularly, the eductor nozzle 120 of FIG. 2 projects longitudinally through the throat 108 and partially into the divergent section 106 to a tip 122 of the eductor nozzle 120. This eductor nozzle 120 is spaced from a sidewall of the downstream discharge passage 90. The eductor nozzle 120 of FIG. 2, for example, is spaced from an inner periphery of the throat 108 by an annular gap 124. Air in the convergent section 104 may thereby flow past the eductor nozzle 120 into the divergent section 106. With this arrangement, the eductor 118 is configured to pump air, within the downstream discharge passage 90 upstream of the eductor nozzle 120, towards the downstream discharge passage outlet 102.

Referring to FIG. 1, the control system 82 includes one or more actuatable flow regulators and a control module 126. Herein, the term "flow regulator" is used to describe a device which may control fluid flow thereacross. Examples of such flow regulators include, but are not limited to, valves, variable vane arrays, variable nozzles, compressors, pumps and the like. However, for case of description, the passage flow regulators are respectively described below as valves 128 and 130 (e.g., control valves) and the flowpath flow regulator is described below as a variable vane array 132 (e.g., a variable inlet guide vane array).

The cooling air passage valve 128 is arranged inline along the cooling air passage 92 between the cooling air passage inlet 98 and the cooling air passage outlet 110. This cooling air passage valve 128 is configured to regulate the flow of the cooling air through the cooling air passage 92 to the air cooled component 112. For example, the cooling air passage valve 128 may open to deliver a full flow of the cooling air to the air cooled component 112. The cooling air passage valve 128 may close to stop (or reduce to a minimum level) the flow of the cooling air to the air cooled component 112. It is also contemplated the cooling air passage valve 128 may be arranged in one or more intermediate positions to provide an intermediate flow of the cooling air to the air cooled component 112.

The bleed passage valve 130 is arranged inline along the bleed passage 116 between the downstream bleed port 114 and the eductor nozzle 120. This bleed passage valve 130 is configured to regulate a flow of bleed air through the bleed passage 116 to the eductor 118 and its eductor nozzle 120. For example, the bleed passage valve 130 may open to deliver a full flow of the bleed air to the eductor nozzle 120. The bleed passage valve 130 may close to stop (or reduce to a minimum level) the flow of the bleed air to the eductor nozzle 120. It is also contemplated the bleed passage valve 130 may be arranged in one or more intermediate positions to provide an intermediate flow of the bleed air to the eductor nozzle 120.

The flowpath variable vane array 132 is arranged with the compressor section 36. The flowpath variable vane array 132 of FIG. 1, for example, is disposed within the core flowpath 66 at an upstream end of the HSLPC rotor 49. This flowpath variable vane array 132 is configured to condition (e.g., turn) the flow of the core air entering the HSC block 40B. The flowpath variable vane array 132 is also configured to regulate the flow of the core air passing from the LSC block 40A to the HSC block 40B. For example, as variable stator vanes 134 of the flowpath variable vane array 132 are pivoted in a first direction, those variable stator vanes 134 may be turned so as to decrease a flow area through the flowpath variable vane array 132. By contrast, as the variable stator vanes 134 of the flowpath variable vane array 132 are pivoted in a second direction, those variable stator vanes 134 may be turned so as to increase the flow area through the flowpath variable vane array 132.

The control module 126 is in signal communication (e.g., hardwired and/or wirelessly coupled) with the cooling air passage valve 128, the bleed passage valve 130 and an actuator 135 configured to move the variable stator vanes 134 of the flowpath variable vane array 132. This control module 126 may (or may not) be part of a controller for the turbine engine 26; e.g., an onboard engine controller such as an electronic engine controller (EEC), an electronic control unit (ECU), a full-authority digital engine controller (FADEC), etc. The control module 126 may be implemented with a combination of hardware and software. The hardware may include memory 136 and at least one processing device 138, which processing device 138 may include one or more single-core and/or multi-core processors. The hardware may also or alternatively include analog and/or digital circuitry other than that described above.

The memory 136 is configured to store software (e.g., program instructions) for execution by the processing device 138, which software execution may control and/or facilitate performance of one or more operations. The memory 136 may be a non-transitory computer readable medium. For example, the memory 136 may be configured as or include a volatile memory and/or a nonvolatile memory. Examples of a volatile memory may include a random access memory (RAM) such as a dynamic random access memory (DRAM), a static random access memory (SRAM), a synchronous dynamic random access memory (SDRAM), a video random access memory (VRAM), etc. Examples of a nonvolatile memory may include a read only memory (ROM), an electrically erasable programmable read-only memory (EEPROM), a computer hard drive, etc.

During certain operational conditions, the core air compressed by the LSC block 40A may carry debris such as sand, dirt, or other foreign matter ingested by the turbine engine 26. As the core air is propelled axially aft by the LSLPC rotor 48, momentum of the relatively heavy debris may propel that debris towards/against the outer periphery of the core flowpath 66. An outer boundary flow of the core air with the debris may then be separated from a remainder and a majority of the (e.g., clean) core air. The boundary flow of the core air with the debris is directed into the manifold passage 86 through the upstream bleed port 84, whereas the remainder of the core air may continue to flow within the core flowpath 66 into the HSC block 40B. A majority of the debris may then continue to travel radially outward through the manifold passage 86 and the upstream discharge passage 88 into the bypass flowpath 68. However, even where some of the lighter debris turns axially aft with a majority of the bleed air towards the passages 90 and 92, momentum of the lighter debris may continue to propel that debris radially outward and into the downstream discharge passage 90. This lighter debris with some of the bleed air may then be pumped via suction generated by the eductor 118 through the downstream discharge passage 90 and into the bypass flowpath 68. Briefly, the eductor 118 is powered by bleeding additional (e.g., higher pressure) core air from the core flowpath 66 through the downstream bleed port 114 and directing that bleed air through the bleed passage 116 to the eductor nozzle 120. A remainder and a majority of the (e.g., clean) bleed air may then flow through the cooling air passage 92 to the air cooled component 112.

In addition to facilitating debris removal from the engine core 24 and cooling the air cooled component 112, the air system 28 may also facilitate improved turbine engine stability. The core air, for example, may be bleed from the core flowpath 66 through the upstream bleed port 84 to reduce or prevent surge of the LSLPC rotor 48. Similarly, the core air may be bled from the core flowpath 66 through the downstream bleed port 114 to reduce or prevent surge of the HSLPC rotor 49. Here, flow through the bleed ports 84 and 114 may be individually tailored using the control system 82 to specific characteristics of the LPC rotors 48 and 49.

The geartrain 62 may be configured as an epicycle gear system. The geartrain 62, for example, may include a sun gear, a ring gear, a plurality of intermediate gears and a carrier. The sun gear may be rotatable about the axis 34 and coupled to the low speed rotating structure 60 and its low speed shaft 58. The ring gear circumscribes the sun gear. The intermediate gears are arranged and may be equispaced circumferentially around the sun gear in an array. Each of these intermediate gears is radially between and meshed with the sun gear and the ring gear. Each of the intermediate gears is rotatable mounted to the carrier. In some embodiments, the geartrain 62 may be configured as a star gear system. The ring gear, for example, may be rotatable about the axis 34 and coupled to the fan rotor 30, and the carrier may be stationary. In other embodiments, the geartrain 62 may be configured as a planetary gear system. The carrier, for example, may be rotatable about the axis 34 and coupled to the fan rotor 30, and the ring gear may be stationary.

Figure 3:
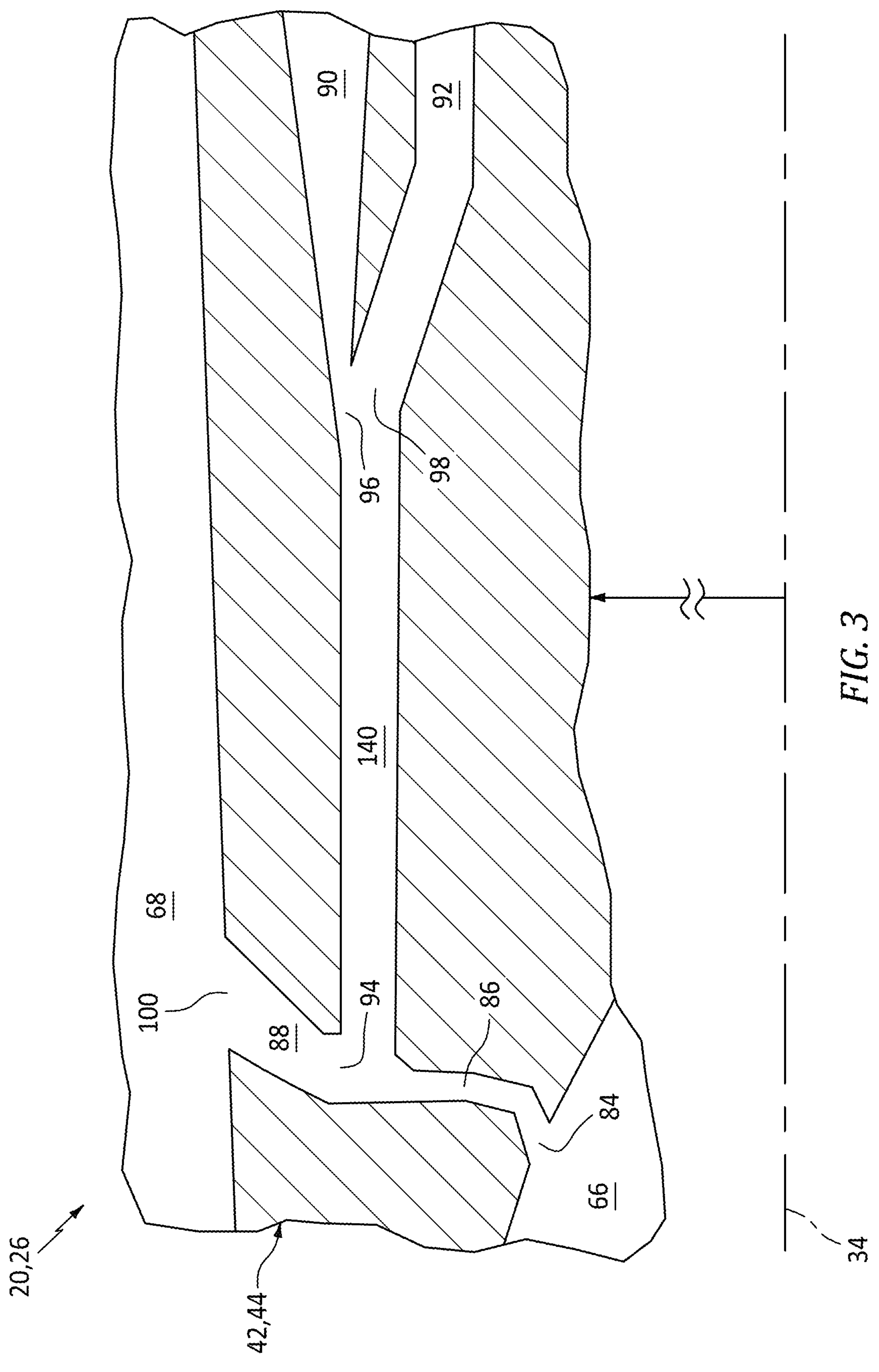
FIG. 3 is a schematic illustration of a portion of the aircraft propulsion system at an interface between various air system circuit passages.

In some embodiments, referring to FIG. 1, each of the passages 88, 90 and 92 may be directly connected to the manifold passage 86. In other embodiments, referring to FIG. 3, the downstream discharge passage 90 and the cooling air passage 92 may be fluidly coupled to the manifold passage 86 by an intermediate passage 140; e.g., another manifold passage.

While the downstream discharge passage 90 is described above with an eductor-type pump, the present disclosure is not limited to such an exemplary arrangement. It is contemplated, for example, the downstream discharge passage 90 may also or alternatively be configured with another type of pump.

Figure 4:
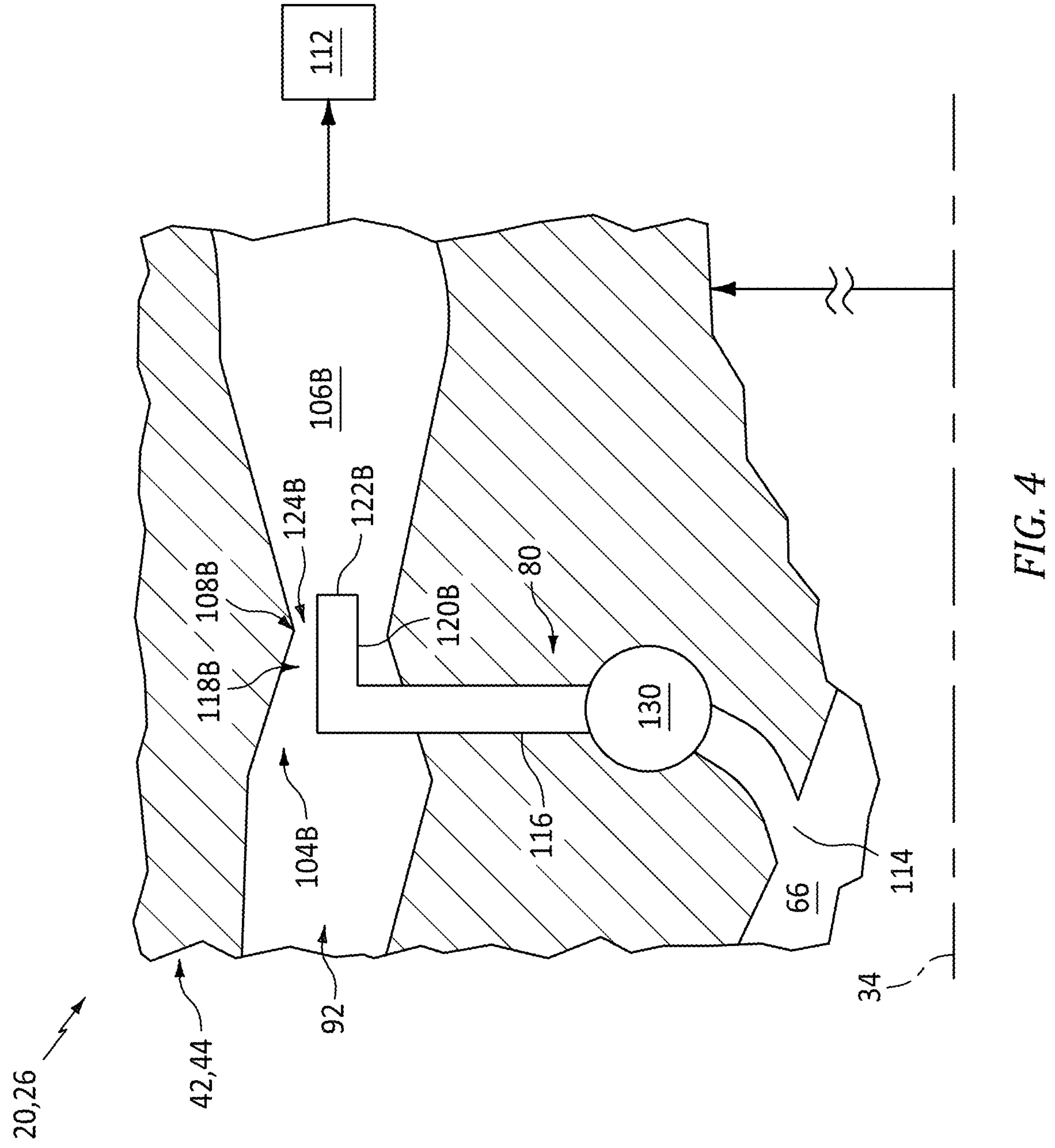
FIG. 4 is a schematic illustration of a portion of the aircraft propulsion system at another eductor.

In some embodiments, referring to FIG. 4, the high pressure air circuit 80 may include an eductor 118B (e.g., an ejector) for the cooling air passage 92 in addition to (or as an alternative to) the eductor 118 for the downstream discharge passage 90. This eductor 118B and its associated elements may each have a similar configuration as the eductor 118 and the associated elements described above and, thus, each like element is labeled with a common number paired with the letter "B". With the arrangement of FIG. 4, the eductor 118B may increase a pressure of the bleed air directed out of the cooling air passage 92 and provided to the air cooled component 112. The air cooled component 112 my thereby be located as shown in FIG. 1, or alternatively disposed further upstream along the core flowpath 66. The air cooled component 112, for example, may be located within the turbine section 38; e.g., within the HPT section 38A, between the HPT section 38A and the LPT section 38B, or within the LPT section 38B. The present disclosure, however, is not limited to such exemplary air cooled component locations.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:

1. An assembly for a turbine engine, comprising:

an engine core including a compressor section and a core flowpath, the compressor section including a first compressor rotor, a second compressor rotor and a third compressor rotor, the core flowpath extending across the first compressor rotor, the second compressor rotor and the third compressor rotor between an inlet into the core flowpath and an exhaust from the core flowpath, and the second compressor rotor arranged within the core flowpath between the first compressor rotor and the third compressor rotor; and an air system including an eductor, a first bleed port, a second bleed port, a first passage and a second passage, the eductor comprising a nozzle disposed in the second passage, the first bleed port disposed along the core flowpath at a downstream end of the first compressor rotor, the first bleed port fluidly coupling the core flowpath to the first passage and the second passage in parallel, the second bleed port disposed along the core flowpath at a downstream end of the second compressor rotor, and the second bleed port fluidly coupling the core flowpath to the nozzle.

2. The assembly of claim 1, wherein the engine core further includes a first turbine rotor and a geartrain;

the core flowpath extends across the first turbine rotor between the second compressor rotor and the exhaust from the core flowpath;

the first turbine rotor is coupled to the first compressor rotor through the geartrain; and the first turbine rotor is coupled to the second compressor rotor independent of the geartrain.

3. The assembly of claim 2, further comprising:

a propulsor rotor outside of the engine core;

the first turbine rotor coupled to the propulsor rotor through the geartrain; and the first compressor rotor coupled to the geartrain through the propulsor rotor.

4. The assembly of claim 2, wherein the geartrain comprises a star gear system.

5. The assembly of claim 2, wherein the geartrain comprises a planetary gear system.

6. The assembly of claim 2, wherein the engine core further includes a second turbine rotor;

the core flowpath extends across the third compressor rotor and the second turbine rotor between the second compressor rotor and the first turbine rotor; and the second turbine rotor is coupled to the third compressor rotor, and the second turbine rotor is configured to rotate independent of the first turbine rotor.

7. The assembly of claim 1, wherein the air system further includes a valve configured to regulate gas flow from the second bleed port to the nozzle.

8. The assembly of claim 1, wherein the second passage includes a convergent section, a divergent section and a throat between the convergent section and the divergent section;

the divergent section is downstream of the convergent section; and the nozzle projects through the throat and into the divergent section to a tip of the nozzle.

9. The assembly of claim 1, further comprising:

a bypass flowpath disposed outside of the engine core;

an outlet from the first passage and an outlet from the second passage fluidly coupled to the bypass flowpath.

10. The assembly of claim 9, wherein the outlet from the second passage is downstream of the outlet from the first passage along the bypass flowpath.

11. The assembly of claim 1, wherein the engine core further includes an air cooled component along the core flowpath downstream of the second compressor rotor; and an outlet from the second passage is fluidly coupled to the air cooled component.

12. The assembly of claim 1, wherein the engine core further includes a variable guide vane array along the core flowpath at an upstream end of the second compressor rotor.

13. The assembly of claim 1, wherein the air system further includes a third passage radially inboard of the second passage; and the first bleed port fluidly couples the core flowpath to the second passage and the third passage in parallel.

14. The assembly of claim 13, wherein the engine core further includes an air cooled component along the core flowpath downstream of the second compressor rotor; and the air system is configured to direct air to the air cooled component from an outlet from the third passage.

15. The assembly of claim 13, wherein the air system further includes a valve configured to regulate gas flow through the third passage.

16. The assembly of claim 13, wherein the air system further includes a first valve, a second valve and a control module in signal communication with the first valve and the second valve;

the first valve is configured inline between the second bleed port and the nozzle; and the second valve is configured inline along the third passage.

17. The assembly of claim 16, wherein the engine core further includes a variable guide vane array along the core flowpath at an upstream end of the second compressor rotor; and the control module is in signal communication with an actuator for the variable guide vane array.

18. An assembly for a turbine engine, comprising:

an engine core including a first compressor rotor, a second compressor rotor, an air cooled component and a core flowpath, the air cooled component along the core flowpath downstream of the second compressor rotor, and the core flowpath extending across the first compressor rotor and the second compressor rotor between an inlet into the core flowpath and an exhaust from the core flowpath; and an air system including an eductor, a first bleed port, a second bleed port, a discharge passage and a cooling air passage, the eductor comprising a nozzle disposed in the discharge passage, the first bleed port disposed along the core flowpath at a downstream end of the first compressor rotor, the first bleed port fluidly coupling the core flowpath to the discharge passage and the cooling air passage in parallel, the second bleed port disposed along the core flowpath at a downstream end of the second compressor rotor, the second bleed port fluidly coupling the core flowpath to the nozzle, and the cooling air passage configured to deliver cooling air to the air cooled component;

wherein a low pressure compressor section comprises the first compressor rotor and the second compressor rotor.

19. The assembly of claim 18, further comprising:

a propulsor rotor;

the engine core further including a turbine rotor and a geartrain;

the turbine rotor configured to drive rotation of the propulsor rotor and the first compressor rotor through the geartrain; and the turbine rotor configured to drive rotation of the second compressor rotor independent of the geartrain.

20. An assembly for a turbine engine, comprising:

an engine core including a low pressure compressor rotor, a high pressure compressor rotor, an air cooled component and a core flowpath, the air cooled component along the core flowpath downstream of the low compressor rotor, and the core flowpath extending across the low-pressure compressor and the high-pressure compressor between an inlet into the core flowpath and an exhaust from the core flowpath;

a bypass flowpath outside of the engine core; and an air system including an air pump, a first bleed port, a second bleed port, an upstream discharge passage, a downstream discharge passage and a cooling air passage, the air pump disposed with the downstream discharge passage, the first bleed port disposed along the core flowpath at the low pressure compressor rotor, the first bleed port fluidly coupling the core flowpath to the upstream discharge passage, the second bleed port disposed along the core flowpath upstream of the high pressure compressor rotor, the second bleed port fluidly coupling the core flowpath to the air pump, the downstream discharge passage and the cooling air passage in parallel, an outlet from the upstream discharge passage and an outlet from the downstream discharge passage fluidly coupled to the bypass flowpath with the outlet from the downstream discharge passage disposed downstream of the outlet from the upstream discharge passage along the bypass flowpath, and the cooling air passage configured to deliver cooling air to the air cooled component.

* * * * *